US 9,019,708 B2

(12) United States Patent
Shinsato et al.

(10) Patent No.: US 9,019,708 B2
(45) Date of Patent: Apr. 28, 2015

(54) APPARATUS AND SYSTEMS HAVING STORAGE DEVICES IN A SIDE ACCESSIBLE DRIVE SLED

(75) Inventors: Macen Shinsato, Wichita, KS (US); Mohamad H. El-Batal, Boulder, CO (US); Robert E. Stubbs, Longmont, CO (US); Jason M. Stuhlsatz, Dacula, GA (US); John R. Kloeppner, Buhler, KS (US)

(73) Assignee: LSI Corporation, Milpitas, CA (US)

( * ) Notice: Subject to any disclaimer, the term of this patent is extended or adjusted under 35 U.S.C. 154(b) by 353 days.

(21) Appl. No.: 13/217,650

(22) Filed: Aug. 25, 2011

(65) Prior Publication Data

US 2013/0050955 A1   Feb. 28, 2013

(51) Int. Cl.
*H05K 7/16* (2006.01)
*H05K 5/00* (2006.01)
*G06F 1/18* (2006.01)
*G11B 33/12* (2006.01)

(52) U.S. Cl.
CPC ............ *G06F 1/181* (2013.01); *G06F 1/187* (2013.01); *G11B 33/128* (2013.01)

(58) Field of Classification Search
CPC ....... G06F 1/181; G06F 1/1624; G06F 1/187; H05K 7/1489; H04M 1/0237
USPC ............ 361/724–727, 679.01–679.45, 361/679.55–679.55
See application file for complete search history.

(56) References Cited

U.S. PATENT DOCUMENTS

| | | | |
|---|---|---|---|
| 5,506,750 A * | 4/1996 | Carteau et al. | 361/679.32 |
| 6,459,571 B1 * | 10/2002 | Carteau | 361/679.33 |
| 6,618,260 B2 * | 9/2003 | Willis et al. | 361/752 |
| 6,831,839 B2 | 12/2004 | Bovell | |
| 6,850,410 B2 | 2/2005 | Peeke et al. | |
| 7,312,999 B1 * | 12/2007 | Miyamura et al. | 361/724 |
| 7,583,507 B2 * | 9/2009 | Starr et al. | 361/727 |
| 2003/0147220 A1 * | 8/2003 | Fairchild | 361/726 |
| 2006/0187634 A1 | 8/2006 | Tanaka et al. | |

FOREIGN PATENT DOCUMENTS

JP     2006-235696      8/2006

OTHER PUBLICATIONS

"StorageWorks 600 Modular Disk System (MDS600) Customer presentation," 2009 Hewlet Packard Development Company, LP.

* cited by examiner

*Primary Examiner* — Nidhi Thaker
(74) *Attorney, Agent, or Firm* — Duft Bornsen & Fettig

(57) ABSTRACT

Apparatus and systems for improved access to storage devices from the sides of sleds mounted in storage enclosures. Embodiments provide apparatus and systems for a sled in a storage enclosure that provides access to storage devices on either side of the sled when the sled is slid forward out of its enclosure. Multiple sleds may be enclosed within a single enclosure to permit access to a portion of the storage devices in the enclosure hence reducing the problems of instability of the rack if the enclosure is mounted near the top of the rack.

20 Claims, 5 Drawing Sheets

APPARATUS AND SYSTEMS HAVING STORAGE DEVICES IN A SIDE ACCESSIBLE DRIVE SLED

BACKGROUND

1. Field of the Invention

The invention relates generally to storage systems and more specifically relates to a mounting and enclosure method and apparatus for hot swappable storage devices in a side accessible sled arrangement.

2. Discussion of Related Art

Storage systems, especially larger storage systems, often utilize enclosures that mount in racks/cabinets where each enclosure provides power, cooling, and various other common resources for a plurality of storage devices (e.g., rotating magnetic or optical disk drives as well as solid-state drives). In large storage systems, there may be several such enclosures in a tall rack and potentially several such racks.

In high-reliability storage systems (e.g., RAID storage systems), it is an important aspect that the storage devices may be "hot swapped"—i.e., inserted and removed with power applied. In such systems, a single failed storage device does not result in system failure of the storage system but rather merely degrades performance of the system somewhat until the failed device is replaced with a functioning device and the data of the failed device is rebuilt on the replacement device. The failed device and the replacement device are therefore "hot swapped" such that the storage system continues essentially normal operation while the failure is corrected. To perform hot swaps of storage devices housed within an enclosure, the enclosure may be pulled from the rack (e.g., slid forward on sliding rails) to permit the user to open the enclosure and swap a failed storage device (all performed with power on the enclosure and the storage devices within the enclosure). After hot swapping the failed storage device for a functioning device, the enclosure may be closed and slid back into the rack—again all while the storage devices in the enclosure have power applied and while the storage devices continue operating.

In many large storage systems, rack mounted enclosures can reach significant heights to provide for desired level of storage density in the available floor space. Some enclosures provide for access to all storage devices from the front of the enclosure—the front portion facing an administrative user of the storage system. However, such enclosures provide for very limited storage density in that the only storage devices in the enclosure that are positioned along the front portion of the enclosure are accessible to the administrator for hot swap.

To increase the density of storage in larger storage systems, most present-day enclosures provide access to a larger number of storage devices from the top of the enclosure structure. In such higher density enclosures, an administrative user effectuates a "hot swap" of storage devices by sliding the enclosure out from its rack and accessing the top of the enclosure. To replace a failed storage device (or to perform other administrative services), the enclosure is slid outward from the rack in which it is mounted, a top cover of the enclosure is removed or otherwise opened, and the failed storage device is hot swapped with a replacement device by accessing the open top of the enclosure.

Some racks used to mount enclosure can be quite tall. Accessing the top of an enclosure (i.e., to hot swap a failed storage device) can be, at best, awkward for an administrative user. In some extreme cases, a ladder, stool, or other aid may be required to reach into the enclosure from its opened top side to replace a failed device (or to perform other services). Or, a system designer may require that all high-density storage enclosures be positioned lower in the rack/cabinet to simply avoid such problems for administrative users thus limiting the density of storage that may occupy a given floor space. In addition, when an enclosure mounted near the top of a rack is pulled forward from the rack (extending outward to permit administrator access—with or without a ladder or stool), the rack may become unstable due to the significant weight extending forward from the rack near the top. To reduce this problem, enclosures mounted higher in the rack may be restricted to lower density of storage devices or the rack may be designed with counter-weights or extended feet to support the higher weight mounted near the top.

It is therefore an ongoing challenge to provide high storage density in an enclosure while enabling ease of use for an administrative user to access storage devices within the enclosure (e.g., for hot swap or other administrative functions).

SUMMARY

The present invention solves the above and other problems, thereby advancing the state of the useful arts, by providing apparatus and systems for a sled in a storage enclosure that provides access to storage devices on either side of the sled when the sled is slid forward out of its enclosure. Multiple sleds may be enclosed within a single enclosure to permit access to a portion of the storage devices in the enclosure hence reducing the problems of instability of the rack if the enclosure is mounted near the top of the rack.

In one aspect hereof, an apparatus for storage devices in an enclosure of a storage system is provided. In another aspect, a storage system is provided having such an enclosure and apparatus. The enclosure has a front side opening allowing the apparatus to be inserted into the enclosure and removed from the enclosure. The apparatus comprises a substantially planar backplane printed circuit assembly (PCA). The backplane PCA has a first side coplanar with a second side wherein the first and second sides are substantially orthogonal to a front edge of the backplane PCA. The backplane PCA is adapted to be slid into the front side opening of the enclosure when the front edge of the backplane PCA is in a substantially vertical orientation. The apparatus further comprises a first plurality of connectors coupled with the first side wherein each connector of the first plurality of connectors is adapted to receive a mated connector of a storage device to communicatively couple the PCA backplane to the storage device. The apparatus further comprises a rear connector coupled with a rear edge of the backplane PCA wherein the rear connector is communicatively coupled with the first plurality of connectors and wherein the rear connector is adapted to communicatively couple each of the first plurality of connectors with circuits external to the apparatus. Storage devices may be coupled and/or decoupled with any of the first plurality of electronic connectors when the apparatus is slid forward extending outward from the front side opening of the enclosure. In other aspects hereof, both sides of the apparatus may have a plurality of connectors coupled with the rear connector to permit storage devices to be coupled with connectors on either side of the backplane PCA.

DETAILED DESCRIPTION OF THE DRAWINGS

Figure 1:
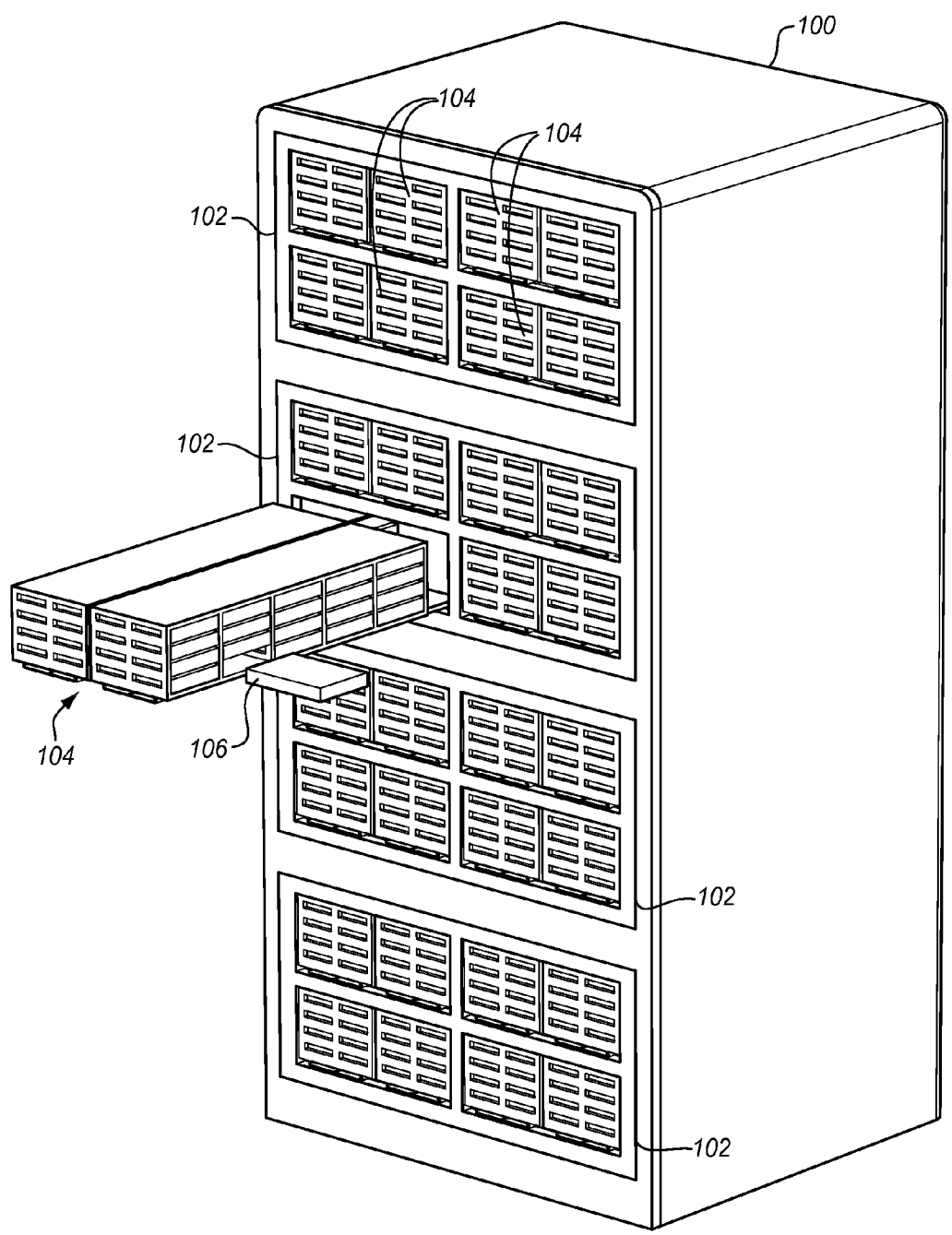
FIG. 1 is a block diagram of an exemplary storage system having a plurality of enclosures with one or more sleds in each enclosure in accordance with features and aspects hereof

FIG. 1 is a block diagram of an exemplary storage system 100 (e.g., a "rack" adapted for mounting storage enclosures and other components of a system) comprising a plurality of enclosures 102. Each enclosure 102 is adapted to house a plurality of storage devices 106 communicatively coupled through respective sleds 104 for communications with appropriate storage controllers and/or host systems. Each storage device 106 may be any suitable mass storage device including, for example, rotating magnetic or optical disk drives, solid-state drives, etc. Each storage device may be communicatively coupled utilizing any of several well-known, commercially available communication media and protocols including, for example, Serial Attached SCSI (SAS), Serial Advanced Technology Attachment (SATA), parallel SCSI or ATA, etc. Each enclosure 102 comprises one or more sleds. Each sled 104 is adapted to receive a plurality of storage devices 106.

Each sled 104 of each enclosure 102 is adapted to slide out from a front opening of its respective enclosure and thereby provides access to each of the storage devices 106 coupled with the sled from the right and/or left side of the sled (viewing the system 100 from its front side). By contrast, prior enclosure designs either provided access only to a limited number of storage devices accessed at the front opening of the enclosure or provided access to a larger number of storage devices through a top opening of the enclosure. Such top opening enclosures are difficult to access when the enclosure is positioned high in a storage system rack. Thus, as compared to prior enclosure designs, a higher density of storage devices 106 may be coupled within enclosure 102 and all storage devices 106 are easily accessible from the left and right sides of sled 104 when the sled is slid forward out of the front opening of the enclosure regardless of the height at which the enclosure is mounted in the storage system.

It will be understood by those of ordinary skill in the art that each enclosure 102 may comprise a front cover to cover the front opening (e.g., for aesthetics and/or to control cooling air flows). Such a front cover may be removable or may be hinged to allow access to sleds 104 enclosed within the enclosure 102. As shown in FIG. 1, any such cover is removed for simplicity and brevity of this discussion.

Those of ordinary skill in the art will readily recognize that any number of such enclosures 102 may be mounted within a storage system 100 and each enclosure may comprise any number of sleds 104 each adapted to receive any number of storage devices 106.

Figure 2:
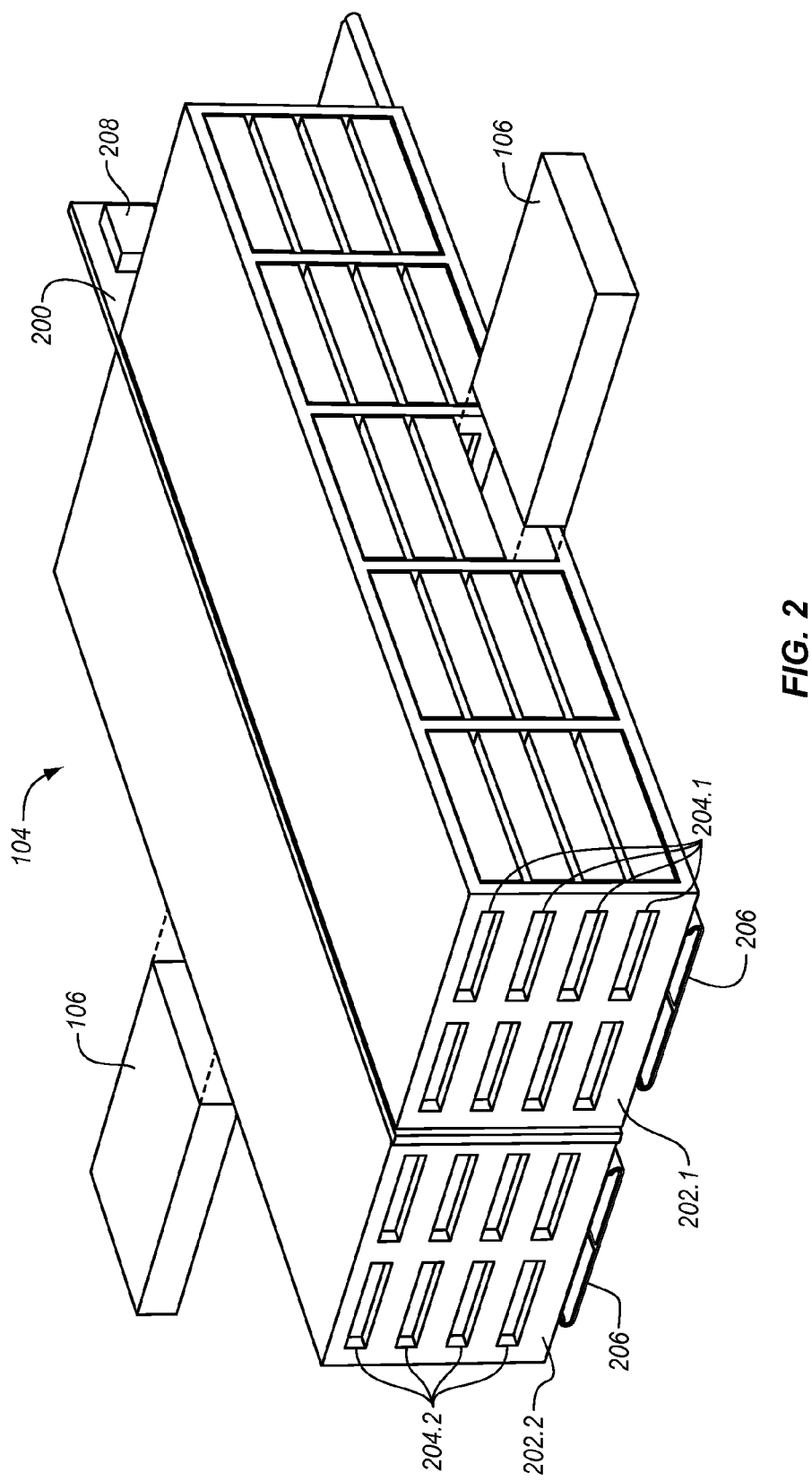
FIGS. 2 and 3 are block diagrams showing perspective views of an exemplary sled of FIG. 1 removed from its enclosure.

FIG. 2 is a block diagram providing additional exemplary details of one sled 104. FIG. 2 is a block diagram showing a perspective top view of sled 104 removed from its enclosure 102. Sled 104 comprises backplane printer circuit assembly (PCA) 200 adapted to receive a plurality of storage devices 106. Backplane PCA 200 communicatively couples each of the plurality of storage devices 106 with one or more rear connectors 208 which, in turn, couples the storage devices with other components of the storage system (e.g., storage controllers and/or host systems). Rear connectors 208 may be simple passive components that merely extend electrical signals from the plurality of storage devices 106 to controlling components of the system (e.g., other components of system 100 and/or host systems). In some exemplary embodiments, rear connectors 208 may comprise active components to convert the electrical signals from the plurality of storage devices 106 to another communication medium and protocol. For example, storage devices 106 could be SATA storage devices and rear connectors 208 may convert the signals for transmission over a SAS communication medium and protocol. Or, for example, SAS storage devices 106 could be coupled through rear connectors 208 such that the signals are converted to Fibre Channel (FC) media and protocols. Numerous other possible conversions by rear connectors 208 will be readily apparent to those of ordinary skill in the art. Backplane PCA 200 is a substantially planar component having a first side and a second side substantially orthogonal to a front edge of backplane PCA 200. The first side comprises a plurality of connectors (not shown), each connector adapted to receive a mated connector from a corresponding storage device 106. In some embodiments, cage 202.1 provides guidance and support for insertion and removal of storage devices 106. Cage 202.1 thus constrains each storage device 106 in an appropriate position to be mated with a corresponding connector on the first side of backplane PCA 200.

Cage 202.1 is adapted to couple with the right side (first side) of backplane PCA 200 to guide, position, and constrain storage devices 106 to be inserted and mated with connectors on the first side. Cage 202.1 may be attached (removably or otherwise) to backplane PCA 200 by any suitable means. In some embodiments, sled 104 comprises a second cage 202.2 attached to the second side of backplane PCA 200. The second side of backplane PCA 200 also comprises a plurality of connectors (not shown), each connector adapted to receive a mated connector from a corresponding storage device 106. Cage 202.2 (like cage 202.1) guides, positions, and constrains storage devices 106 to be mated with the connectors on the second side of backplane PCA 200. Cage 202.2 (like cage 202.1) may be attached (removably or otherwise) to backplane PCA 200 by any suitable means.

Holes 204.1 and 204.2 in cages 202.1 and 202.2, respectively, enable air flow through the cages and around storage devices 106 when inserted into the cages and coupled with corresponding connectors. Suitable fans (not shown) or other means may be employed in conjunction with the sleds and/or enclosures to provide any required air flow through holes 204.1 and 204.2.

Slide members 206 are attached (removably or otherwise) to sled 104 to permit sled 104 to be slid forward out of the front opening of the enclosure in which the sled is housed. In one exemplary embodiment, slide members 206 may be attached (removably or otherwise) to cages 202.1 and 202.2 on either side of backplane PCA 200. In other exemplary embodiments (not shown), a single slide member 206 may be attached (removably or otherwise) directly to backplane PCA 200. Slide members may be any suitable sliding structure associated with sled 104 and with corresponding members of the storage system (i.e., elements within the enclosure or rack that permit slide members 206 and the attached sled 104 to slide forward out of the front opening of its enclosure.

One or more rear connectors 208 of sled 104 serve to couple backplane PCA 200 (and its attached plurality of connectors and mated storage devices) to storage controllers and/or host systems. Ribbon cables, cable chains, wireless coupling, or other communicative coupling means that permit extension of the signaling medium may be employed to couple rear connectors 208 with storage controllers and/or host systems so that all signal connections may remain active when sled 104 is slid forward in its enclosure (to permit access to storage devices 106). Thus, storage devices 106 may be accessed by a user from either the first or second side of backplane PCA 200 when sled 104 is slid forward and while power is applied (e.g., hot swaps of storage devices 106 may be more easily achieved as compared to prior enclosure designs).

Figure 3:
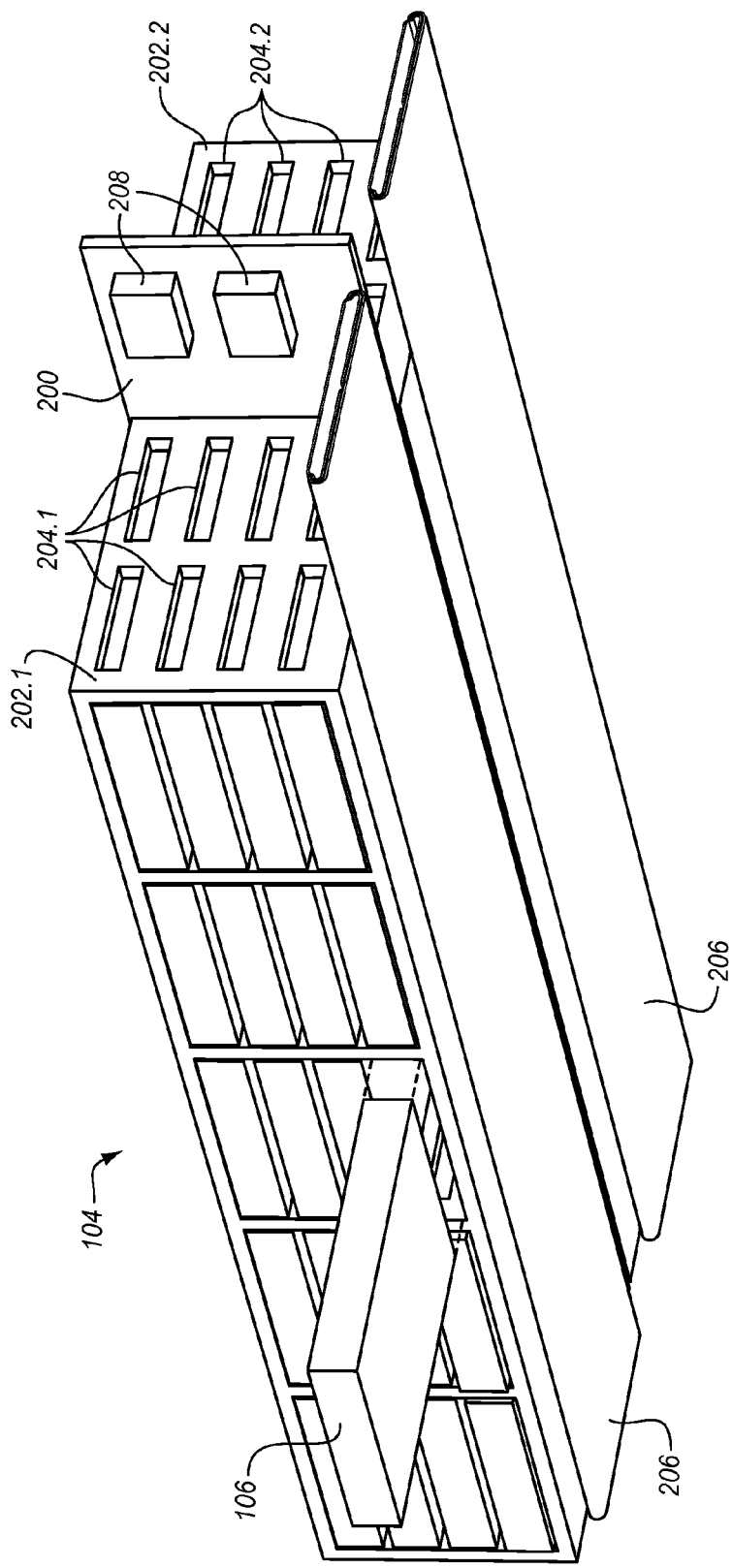

FIG. 3 is a block diagram showing a perspective bottom view of sled 104 removed from its enclosure 102. As compared to FIG. 2, FIG. 3 shows a pair of rear connectors 208 permitting redundant coupling of storage devices 106 attached to backplane PCA 200 with external storage controllers and/or host systems. Further, additional holes 204.1 and 204.2 may be present in the rear sides of cages 202.1 and 202.2, respectively, further enhancing air flow around storage devices 106 through the cages.

Figure 4:
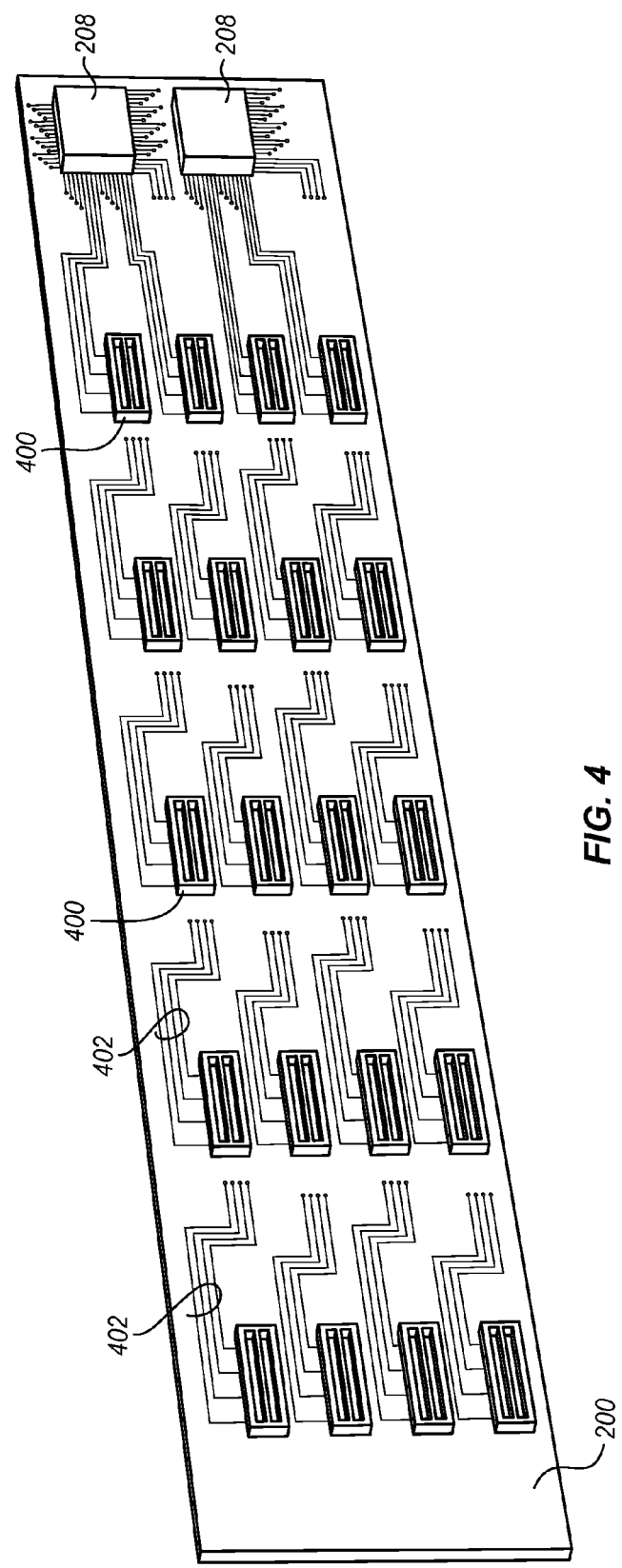
FIG. 4 is a block diagram of an exemplary embodiment of a backplane printed circuit assembly portion of the sled of FIGS. 1 through 3.

FIG. 4 is a diagram providing exemplary additional details of the first side of backplane PCA 200 with its cage and storage devices removed. A plurality of connectors 400 are arranged on the first side, each connector adapted to mate with a corresponding connector of a storage device. Each connector 400 may be any suitable connector appropriate for the desired communication media and protocol including, for example, SAS connectors, SATA connectors, and FC connectors. Signal traces 402 are suitably arranged on backplane PCA 200 to couple each connector 400 with each of rear connectors 208. As shown in FIG. 4, some exemplary embodiments may provide multiple (i.e., redundant) rear connectors 208 coupled with each of connectors 400 through traces 402. Such redundant coupling may be preferred in high-reliability storage applications. It will be understood that traces 402 as shown in FIG. 4 are merely suggestive of the coupling between each connector and each of one or more rear connectors. Actual design and routing of such signal traces on backplane PCA 200 is a well-known matter of design choice. For example, many PCA designs provide multiple layer substrate boards such that traces may be routed along any of the several layers. Still further, as noted above, where both the first and second sides of backplane PCA 200 comprise a plurality of connectors 400, appropriate signal traces 402 also couple each of the connectors on the second side of backplane PCA 200 with each of the one or more rear connectors.

Figure 5:
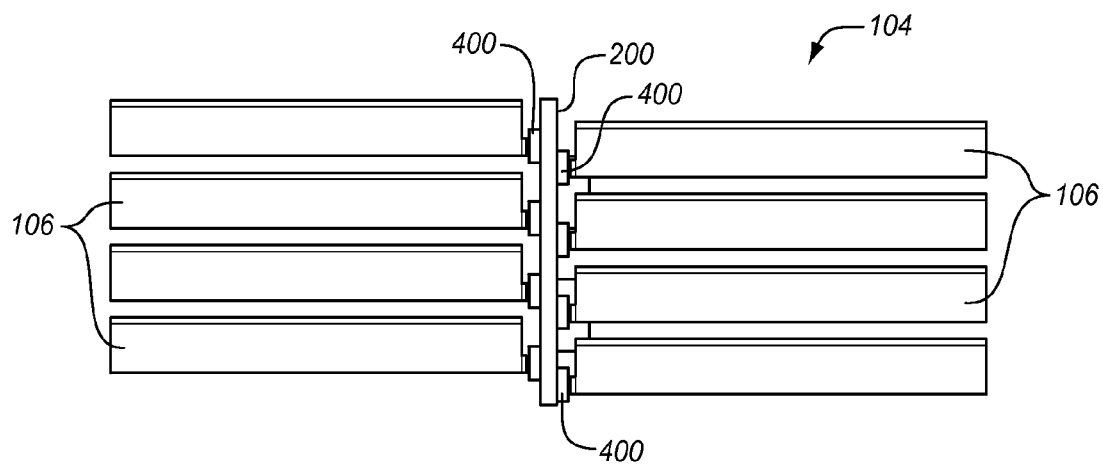
FIGS. 5 and 6 are block diagrams describing exemplary embodiments of the backplane printed circuit assembly of FIGS. 1 through 4 in which connectors are positioned to reduce physical overlap of connectors on both sides of the backplane printed circuit assembly.
Figure 6:
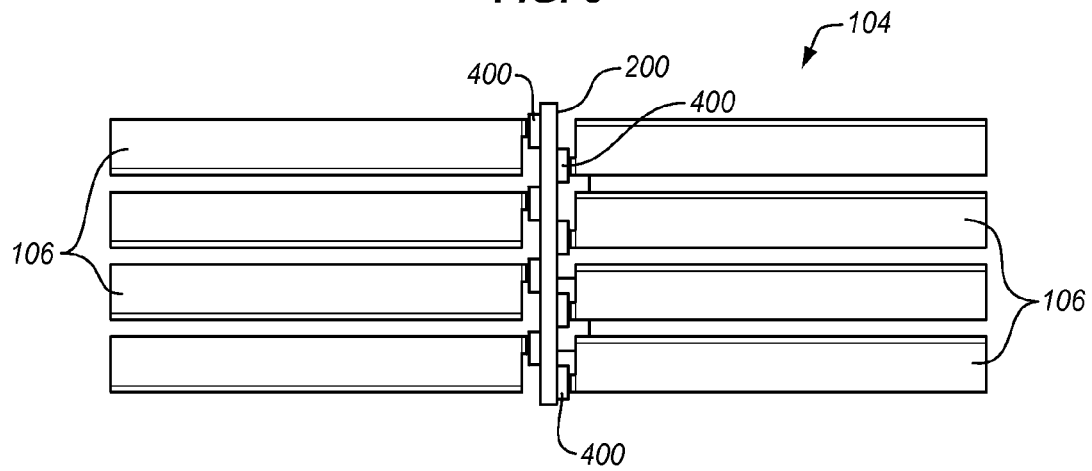

FIGS. 5 and 6 are diagrams showing two exemplary embodiments for positioning and layout of connectors 400 on backplane PCA 200. Where both the first and second sides of backplane PCA 200 have a plurality of connectors 400 for coupling with storage devices 106, connectors 400 may be laid out on backplane PCA 200 to avoid or reduce physical overlap of the connectors on either side of the PCA. Such overlap may present undesired challenges in the manufacture of backplane PCA 200. In one exemplary embodiment of FIG. 5, backplane PCA 200 is viewed from its front edge and shows the plurality of connectors 400 staggered vertically on opposite sides of backplane PCA 200. In the exemplary embodiment of FIG. 5, connectors 400 (and thus storage devices 106) on the second side (left side as shown) may be positioned slightly higher than connectors 400 (and thus storage devices 106) on the first side (right side as shown). This arrangement of the plurality of connectors 400 on each side of backplane PCA 200 reduces problems of physical overlap of the plurality of connectors 400. FIG. 6 shows a second exemplary embodiment in which the plurality of connectors 400 on either side of backplane PCA 200 is staggered in a different pattern as compared to that of FIG. 5. In the configuration of FIG. 6, the plurality of connectors 400 on the second side of backplane PCA 200 are staggered relative to the plurality of connectors on the first side of backplane PCA 200 but in a different pattern than that of FIG. 5. Unlike the configuration of FIG. 5, connectors 400 (and hence storage devices 106) on the second side (left side as shown) are flipped upside down (i.e., inverted) relative to the orientation of connectors 400 (and hence storage devices 106) coupled with connectors 400 on the first side (right side as shown). In this configuration, as compared to that of FIG. 5, the storage devices are positioned at symmetrical heights on both sides of backplane PCA 200. This symmetry may be beneficial for ease of manufacturing and/or for a reduced height dimension of the sled 104. Other configurations of the plurality of connectors 400 on either side of backplane PCA 200 may be beneficial for particular applications as a matter of design choice.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. Apparatus for storage devices in an enclosure of a storage system, the enclosure having a front side opening allowing the apparatus to be inserted into the enclosure and removed from the enclosure, the apparatus comprising: a substantially planar backplane printed circuit assembly (PCA), the backplane PCA having a first surface parallel with and physically offset from a second surface by a thickness of the PCA, wherein the first and second surfaces face outward from the PCA in opposite directions, and are substantially orthogonal to a front edge of the backplane PCA, the front edge oriented substantially vertically, wherein the front edge of the backplane PCA is proximate to the front opening when the apparatus has been inserted into the enclosure, and the first and second surfaces of the backplane PCA are parallel with a direction of travel of the apparatus within the slot; a first plurality of connectors coupled with the first surface that are each adapted to communicatively couple the PCA backplane to a storage device; a second plurality of connectors coupled with the second surface that are each adapted to communicatively couple the PCA backplane to a storage device; and a rear connector coupled with a rear edge of the backplane PCA that is adapted to communicatively couple each of the first and second plurality of connectors with circuits external to the apparatus, wherein storage devices may be coupled and/or decoupled with any of the first or second plurality of connectors when the apparatus is slid forward extending outward from the front side opening of the enclosure; wherein when the front edge of the backplane PCA is in a substantially vertical orientation, the first surface is located on a left portion of the backplane PCA and the second surface is located on a right portion of the backplane PCA and wherein each connector of the second plurality of connectors is positioned on the backplane PCA staggered relative to a corresponding connector of the first plurality of connectors.

2. The apparatus of claim 1 wherein:
a storage device may be physically coupled and/or physically decoupled from the PCA backplane while power is applied to the storage device and to the backplane PCA and the apparatus is slid forward.

3. The apparatus of claim 1 further comprising:
a cage coupled with the first surface of the backplane PCA, the cage having a plurality of guides adapted to receive and position each of a plurality of storage devices to couple with a corresponding connector of the first plurality of connectors.

4. The apparatus of claim 1 wherein: the first plurality of connectors comprise Serial Attached Small Computer Interface (SAS) connectors.

5. The apparatus of claim 1 wherein: the first plurality of connectors comprise Serial Advanced Technology Attachment (SATA) connectors.

6. The apparatus of claim 1 further comprising:
a second rear connector coupled with a rear edge of the backplane PCA wherein the second rear connector is communicatively coupled with the first plurality of connectors and wherein the second rear connector is adapted to provide redundant communicative coupling of each of the first plurality of connectors with circuits external to the apparatus.

7. The apparatus of claim 1 wherein:
the first and second surface each define a long axis that is parallel to the direction of travel of the apparatus within the slot.

8. The apparatus of claim 1 wherein:
the first plurality of connectors comprise Fibre Channel (FC) connectors.

9. A storage system comprising: a storage enclosure comprising a substantially rectangular box having substantially planar top, bottom, right, and left sides defining an interior space accessible via a front opening, the enclosure further comprising a slot to receive a sled through the front opening; and a sled adapted to slide into the slot through the front opening, the sled comprising: a substantially planar backplane printed circuit assembly (PCA), the backplane PCA having a first surface parallel with and physically offset from a second surface wherein the first and second surfaces face outward from the PCA in opposite directions, and are substantially orthogonal to a front edge of the backplane PCA, the backplane PCA having a front edge oriented substantially parallel with the right and left sides of the enclosure, wherein the front edge of the backplane PCA is proximate to the front opening when the sled has slid completely into the slot, and the first and second surfaces of the backplane PCA are parallel with a direction of travel of the sled within the slot; a first plurality of connectors coupled with the first surface that are each adapted to communicatively couple the PCA backplane to a storage device; a second plurality of connectors coupled with the second surface that are each adapted to communicatively couple the PCA backplane to a storage device; and a rear connector coupled with a rear edge of the backplane PCA that is adapted to communicatively couple each of the first and second plurality of connectors with circuits within the enclosure that are external to the sled, wherein storage devices may be coupled and/or decoupled with any of the first or second plurality of connectors when the sled is slid forward extending outward from the front opening of the enclosure, wherein when the front edge of the backplane PCA is in a substantially vertical orientation, the first surface is located on a left portion of the backplane PCA and the second surface is located on a right portion of the backplane PCA, and wherein each connector of the second plurality of connectors is positioned on the backplane PCA staggered relative to a corresponding connector of the first plurality of connectors.

10. The storage system of claim 9 wherein:
a storage device may be physically coupled and/or physically decoupled from the PCA backplane while power is applied to the storage device and to the backplane PCA and the sled is slid forward.

11. The storage system of claim 9 wherein:
the sled further comprises:
a cage coupled with the first surface of the backplane PCA, the cage having a plurality of guides adapted to receive and position each of a plurality of storage devices to couple with a corresponding connector of the first plurality of connectors.

12. The storage system of claim 9 wherein:
the first plurality of connectors comprise Serial Attached Small Computer Interface (SAS) connectors.

13. The storage system of claim 9 wherein:
the first plurality of connectors comprise Serial Advanced Technology Attachment (SATA) connectors.

14. The storage system of claim 9 wherein the sled further comprises:
a second rear connector coupled with a rear edge of the backplane PCA wherein the second rear connector is communicatively coupled with the first plurality of connectors and wherein the second rear connector is adapted to provide redundant communicative coupling of each of the first plurality of connectors with circuits external to the sled.

15. The storage system of claim 9 wherein:
the first and second surface each define a long axis that is parallel to the direction of travel of the sled within the slot.

16. The storage system of claim 9 wherein:
the first plurality of connectors comprise Fibre Channel (FC) connectors.

17. A storage system comprising: a storage enclosure comprising a substantially rectangular box having substantially planar top, bottom, right, and left sides defining an interior space accessible via a front opening, the enclosure further comprising a plurality of slots, each slot adapted to receive a sled through the front opening; and a plurality of sleds, each sled adapted to slide into a slot through the front opening, each sled comprising: a substantially planar backplane printed circuit assembly (PCA), the backplane PCA having a first surface parallel with and physically offset from a second surface by a thickness of the PCA, wherein the first and second surfaces face outward from the PCA in opposite directions, and are substantially orthogonal to a front edge of the backplane PCA, the backplane PCA having a front edge oriented substantially parallel with the right and left sides of the enclosure, wherein the front edge of the backplane PCA is proximate to the front opening when the sled has slid completely into the slot, and the first and second surfaces of the backplane PCA are parallel with a direction of travel of the sled within the slot; a first plurality of connectors coupled with the first surface that are each adapted to communicatively couple the PCA backplane to a storage device; a second plurality of connectors coupled with the second surface that are each adapted to communicatively couple the PCA backplane to a storage device; and a rear connector coupled with a rear edge of the backplane PCA that is adapted to communicatively couple each of the first and second plurality of connectors with circuits within the enclosure that are external to the sled, wherein storage devices may be coupled and/or decoupled with any of the first or second plurality of connectors of a sled when the sled is slid forward extending outward from the front opening of the enclosure, wherein when the front edge of the backplane PCA is in a substantially vertical orientation, the first surface is located on a left portion of the backplane PCA and the second surface is located on a right portion of the backplane PCA, and wherein each connector of the second plurality of connectors of a sled is positioned on the backplane PCA of the sled staggered relative to a corresponding connector of the first plurality of connectors of the sled.

18. The storage system of claim 17 wherein:
the first plurality of connectors comprise Serial Attached Small Computer Interface (SAS) connectors.

19. The storage system of claim 17 wherein:
each sled further comprises:
a first cage coupled with the first surface of the backplane PCA, the first cage having a plurality of guides adapted to receive and position each of a plurality of storage devices to couple with a corresponding connector of the first plurality of connectors; and
a second cage coupled with the second surface of the backplane PCA, the second cage having a plurality of guides adapted to receive and position each of a plurality of storage devices to couple with a corresponding connector of the second plurality of connectors.

20. The storage system of claim 17 wherein:
the first plurality of connectors comprise Fibre Channel (FC) connectors.

* * * * *